(12) United States Patent
Blackburn et al.

(10) Patent No.: US 6,964,430 B2
(45) Date of Patent: Nov. 15, 2005

(54) WELD-LESS DRIVER-SIDE INFLATOR

(75) Inventors: Jeffery S. Blackburn, Lake Orion, MI (US); Paul C. Edwards, II, Marysville, OH (US); Simon A. M. Frith, Warren, MI (US)

(73) Assignee: Automotive Systems Laboratory, Inc., Farmington Hills, MI (US)

( * ) Notice: Subject to any disclaimer, the term of this patent is extended or adjusted under 35 U.S.C. 154(b) by 3 days.

(21) Appl. No.: 10/401,309

(22) Filed: Mar. 27, 2003

(65) Prior Publication Data

US 2003/0214126 A1 Nov. 20, 2003

Related U.S. Application Data

(60) Provisional application No. 60/367,825, filed on Mar. 27, 2002.

(51) Int. Cl.[7] ............................................. B60R 21/26
(52) U.S. Cl. ..................................................... 280/741
(58) Field of Search ................................ 280/731, 736, 280/741; 422/164, 165, 166

(56) References Cited

U.S. PATENT DOCUMENTS

| | | | |
|---|---|---|---|
| 4,296,084 A | 10/1981 | Adams et al. ............... 423/351 |
| 4,561,675 A * | 12/1985 | Adams et al. ............... 280/734 |
| 4,722,551 A | 2/1988 | Adams ........................ 280/736 |
| 4,734,265 A | 3/1988 | Nilsson et al. ............... 422/165 |
| 4,923,212 A | 5/1990 | Cuevas ........................ 280/736 |
| 4,943,086 A | 7/1990 | Cunningham ................ 280/741 |
| 5,000,479 A * | 3/1991 | Werner et al. ............... 280/736 |
| 5,131,679 A | 7/1992 | Novak et al. ................ 280/736 |
| 5,178,547 A | 1/1993 | Bonas et al. ................... 439/34 |
| 5,236,675 A | 8/1993 | Swain et al. ................. 280/740 |
| 5,269,560 A | 12/1993 | O'Loughlin et al. ......... 280/736 |
| 5,454,593 A * | 10/1995 | Armstrong et al. .......... 280/741 |
| 5,466,420 A | 11/1995 | Parker et al. ................ 422/164 |
| 5,482,316 A | 1/1996 | Lang et al. .................. 280/741 |
| 5,489,118 A | 2/1996 | Carothers et al. ............ 280/741 |
| 5,492,366 A | 2/1996 | Osborne et al. .............. 280/741 |
| 5,531,474 A | 7/1996 | Osborne et al. ........... 280/74 D |
| 5,558,366 A | 9/1996 | Fogle, Jr. et al. ............ 280/736 |
| 5,609,361 A | 3/1997 | Bergerson et al. ........... 280/741 |
| 5,621,183 A | 4/1997 | Bailey ....................... 102/202.7 |
| 5,683,108 A | 11/1997 | Blumenthal et al. ......... 280/741 |
| 5,779,268 A | 7/1998 | Smith et al. ................. 280/741 |
| 5,890,735 A | 4/1999 | Smith ......................... 280/737 |
| 5,984,352 A * | 11/1999 | Green et al. ................. 280/736 |
| 5,988,069 A | 11/1999 | Bailey ....................... 102/202.9 |
| 6,056,314 A | 5/2000 | Shirk et al. ................ 280/728.2 |
| 6,068,291 A | 5/2000 | Lebaudy et al. ............. 280/736 |
| 6,073,963 A | 6/2000 | Hamilton et al. ............ 280/741 |
| 6,286,864 B1 | 9/2001 | Green et al. ................. 280/741 |
| 6,295,935 B1 | 10/2001 | Swann et al. ................ 102/530 |

* cited by examiner

Primary Examiner—David R. Dunn
(74) Attorney, Agent, or Firm—L.C. Begin & Associates, PLLC

(57) ABSTRACT

An inflator (10) is provided for supplying gas to a vehicle airbag from the combustion of pyrotechnic materials. The inflator (10) has a two-piece inflator body (12) held together by crimping the body components, rather than welding. An igniter assembly (18) is positioned in a bore (22) in an upper piece (14) of the inflator body and is held in place with a press-fit interface and an adhesive seal. The upper piece (14) of the inflator body is rounded, increasing its strength, and fits partially into the lower piece (16). A booster tube is unnecessary, making the inflator lighter in weight and increasing available volume for propellant.

12 Claims, 3 Drawing Sheets

WELD-LESS DRIVER-SIDE INFLATOR

This Application Claims The Benefit Of The Filing Date Of U.S. Provisional Application Ser. No. 60/367,825, Filed Mar. 27, 2002, And Incorporated Herein By Reference In Its Entirety

TECHNICAL FIELD

The present invention relates generally to gas generators for vehicle inflatable restraint devices, and more particularly to such a device wherein the gas generator is manufactured without welding.

BACKGROUND OF THE INVENTION

Inflatable restraint systems or "airbag" systems have become a standard feature in many new vehicles. These systems have made significant contributions to automobile safety, however, as with the addition of any standard feature, they increase the cost, manufacturing complexity and weight of the vehicles. Technological advances addressing these concerns are typically welcomed by the industry. In particular, the gas generator or inflator used in many occupant restraint systems tends to be the heaviest, most complex component. Thus, trimming weight and assembly time by simplifying the design and manufacturing of airbag inflators, without sacrificing function, has long been a goal of automotive engineers.

The manufacturing steps necessary to assemble the various body components of the inflator are of particular interest to designers seeking to lower manufacturing costs, weight and design complexity. The inflator body components are traditionally welded together, either by conventional welding techniques or with laser welds. For example, in driver-side airbag systems, the inflator often has a disc-shape, and is formed by attaching one or more body cups with circumferential welds. An initiator assembly, or igniter, is also typically welded to one of the body components with a circumferential weld. The various welding processes typically require relatively expensive manufacturing equipment, and can require substantial processing time. Various improvements in the techniques and processes for welding inflator components have been made over the years; however, welding can continue to present challenges. Relatively thick, heavy walls and internal support members in the interior of the gas generator housing may be necessary to ensure that the components can be successfully, safely welded together. Trained operators and relatively expensive equipment are often necessary in the welding process, and for performing post-processing inspections, such as X-ray inspection of the individual welds. In addition, the use of lasers or other welding devices around combustible materials such as the gas generant materials used in inflators presents inherent safety problems.

In response to the concerns associated with welding, various attempts have been made to develop inflator systems capable of weld-less assembly. One example is described in U.S. Pat. No. 4,923,212 to Cuevas. Cuevas discloses an inflator design wherein magnetic fields are used to crimp or form a metal ring about multiple inflator body components. Cuevas requires the use of relatively expensive, complex magnaforming equipment. Moreover, Cuevas exhibits a relatively complex design in that a securing ring is used to complete the assembly.

SUMMARY OF THE INVENTION

It is an object of the present invention to provide an inflator that can be assembled without welding the components together.

It is an object of the present invention to provide an inflator that is light in weight, uses relatively few components, and is easy to assemble.

It is an object of the present invention to provide an inflator with an optimal internal volume for accommodating propellant material.

In accordance with the foregoing and other objects, the present invention provides an inflator for an inflatable restraint system in a vehicle that includes a first body cup having a base and a substantially cylindrical first sidewall extending from the base. The inflator further includes a second body cup press fit with the first body cup, the second body cup having a domed base and a substantially cylindrical second sidewall extending from the domed base and concentric with the first sidewall. An adhesive is disposed between the sidewalls and one or both of the body cups are crimped, thereby securing the first and second body cups without welding.

DETAILED DESCRIPTION OF PREFERRED EMBODIMENTS

Figure 1:
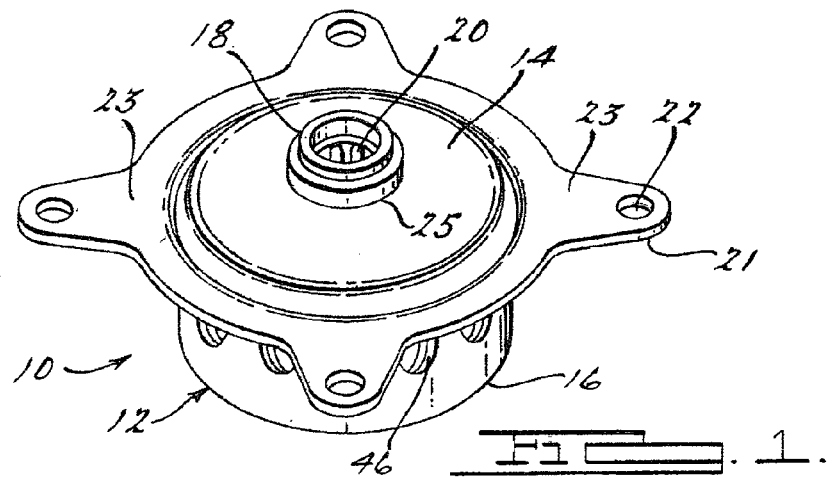
FIG. 1 is a perspective view of an inflator according to a first preferred embodiment of the present invention.

Referring to FIG. 1, there is shown an inflator or gas generator 10 according to a first preferred constructed embodiment of the present invention. Inflator 10 is preferably a metallic inflator for use in a driver-side inflatable restraint assembly (not shown). In a preferred embodiment, inflator 10 is mounted in a housing at the vehicle steering wheel and cooperates with an inflatable restraint device or airbag, supplying inflation gas thereto for cushioning a vehicle occupant in the event of a crash or sudden deceleration, in a manner well known in the art. Inflator 10 includes an inflator body 12 having a lower body piece or first body cup 16 and an upper body piece or second body cup 14. Lower body piece 16 preferably has a laterally projecting mounting flange 21 with a plurality of lobes 23. Each lobe 23 preferably has a hole 22 therein that receives a mounting member or fastener (not shown), for securing inflator 10 to the steering wheel, airbag housing or related components. All the materials used in making and assembling inflator 10 are known in the art and/or readily commercially available. Similarly, the manufacturing techniques necessary to fashion the components according to the present invention are all known in the art.

Upper body piece 14 is preferably rounded or domed, and has an igniter mount 18 press fit into a substantially cylindrical/circular central bore 22. In addition, an adhesive composition such as an epoxy is preferably applied to at least one of upper body piece 14 and igniter mount 18 prior to press fitting the components, and assists in securing them together. Exemplary, but not limiting, adhesives include: 202 2-Part Acrylic, available from the Lord Corporation of Cary, N.C.; various 2 part epoxies available from Vantico Adhesives of East Lansing, Mich.; various 2 part epoxies from Permabond of Bridgewater, N.J. Electrical contacts 20, attached to an igniter (denoted numeral 30 in FIG. 2), are accessible at igniter mount 18, and are connected to the vehicle electrical system. The igniter 30, or squib, may be any suitable known igniter, such as the igniter taught in U.S. Pat. No. 5,934,705, herein incorporated by reference, and may be attached to igniter mount 18 by a variety of methods, for instance by welds or adhesives, or by crimping, pressing or integrally molding igniter 30 with igniter mount 18.

Figure 2:
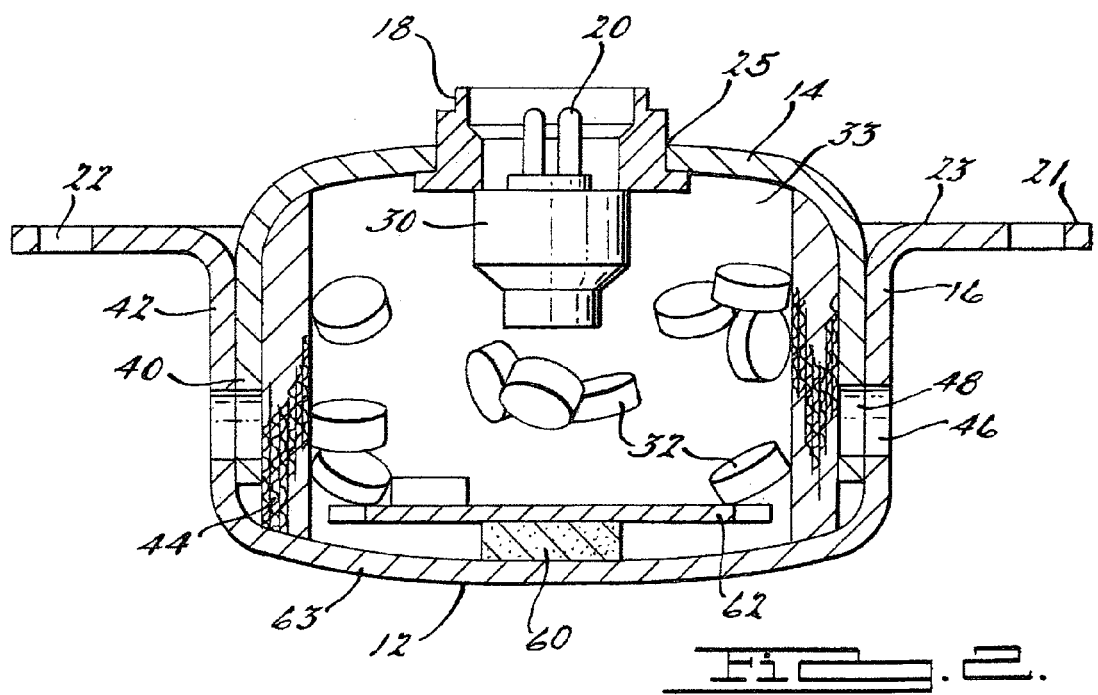
FIG. 2 is a sectioned side view of an inflator similar to the inflator of FIG. 1.

Turning to FIG. 2, there is shown a sectioned side view of an inflator similar to the inflator of FIG. 1. A main propellant charge, preferably a plurality of gas generant tablets 32, is positioned in a combustion chamber 33 of inflator body 12, and ignitable in a conventional manner. The composition used as the main propellant may be any suitable known gas generant composition, although non-azides are preferred. U.S. Pat. Nos. 5,035,757, 5,872,329, 6,074,502, and 6,210,505, incorporated herein by reference, disclose compositions that exemplify, but do not limit, the gas generant compositions contemplated. An additional quantity of an ignition compound, e.g. a booster propellant (not shown), many of which are known in the art, is preferably placed in or near igniter 30, and assists in the ignition of the main charge 32. However, other embodiments are contemplated in which the booster propellant is not used. A perforated or rupturable stamped disk, foil, or burst shim (none shown) may be affixed to the bottom of igniter 30, separating the booster propellant from the main propellant, and facilitating a more robust burn of the booster propellant, in a manner known in the art. A known autoignition tablet(s) 60, is preferably placed in inflator body 12, and is ignitable at an elevated temperature in a conventional manner, preferably being separated from chamber 33 by a substantially discoidal retaining member 62.

Figure 3:
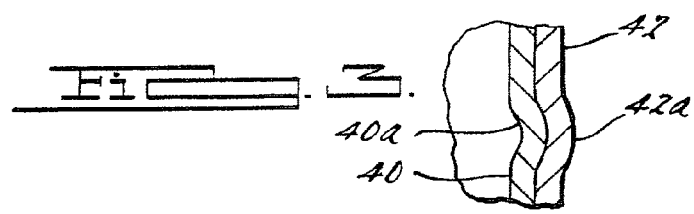
FIG. 3 is a partial sectioned side view of inflator body components, illustrating engaged crimped portions in accordance with a preferred embodiment of the present invention.
Figure 5:
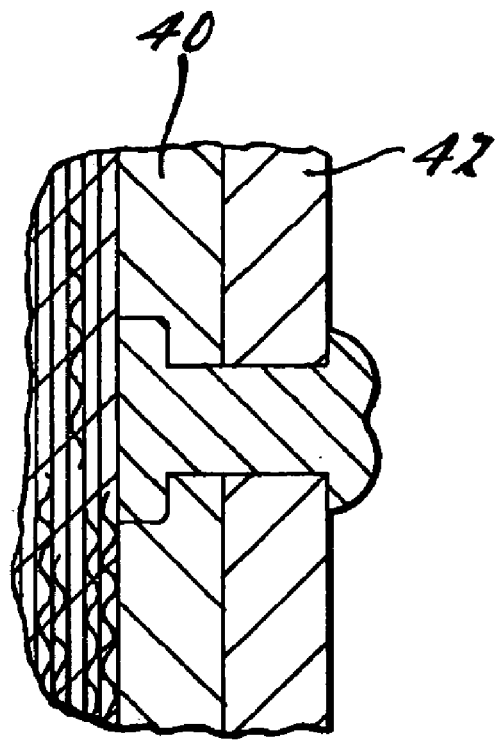
FIG. 5 is a partial sectioned side view of inflator body components, illustrating staked portion in accordance with an alternative embodiment of the present invention.

FIG. 2 further illustrates the curved or domed external surface of upper piece 14, as well as a downwardly projecting portion or second sidewall 40 of top piece 14. Downwardly projecting portion 40 is preferably substantially cylindrical and is press fit at least partially into lower piece 16. When the respective components are press fit together, second sidewall 40 is preferably positioned substantially flush with the inner side of a substantially cylindrical sidewall or first sidewall 42 of lower piece 16. In a preferred embodiment, sidewalls 40 and 42 are substantially linear. Stated another way, the sidewalls are both preferably straight-sided cylinders, which are arranged concentrically. The press fit interface of sidewall 40 with sidewall 42 assists in holding the top 14 and bottom 16 portions of inflator body 12 together, in cooperation with an adhesive. Prior to pressing the components together, the adhesive composition, similar to the adhesives described with respect to attachment of the igniter mount, is preferably applied to the portions of sidewalls 40 and 42 that are adjacent when the components are pressed to the desired degree. In particular, suitable adhesives include: 202 2 Part Acrylic, available from the Lord Corporation of Gary, N.C.; various 2 part epoxies available from Vantico Adhesives of East Lansing, Mich.; various 2 part epoxies available from Permabond of Bridgewater, N.J. In a preferred embodiment, the body portions 14 and 16 are also secured by crimping one or both of the body pieces (not shown in FIG. 2). In particular, sidewalls 40 and 42 are preferably circumferentially crimped such that when body components 16 and 14 are pressed together, the crimped portions are pressed into an overlapping arrangement. Referring to FIG. 3, there is shown a partial sectioned side view of exemplary sidewalls 40 and 42, illustrating overlapping circumferential crimps therein, identified by numerals 40*a* and 42*a*, respectively. It should be appreciated that crimps 40*a* and 42*a* are not to scale, and varying degrees and styles of crimping might be employed, so long as body components 16 and 14 are securely engaged when pressed together. Thus, in accordance with the embodiment shown in FIG. 3, the respective body components are preferably crimped prior to pressing them together. The two body components are therefore preferably crimped, axially aligned, then pressed together until the crimps overlap, locking the components together. Those skilled in the art will appreciate that other crimp types and methods might be used without departing from the scope of the present invention. For example, in one alternative embodiment (not shown), rather than circumferential crimps brought into overlapping engagement, as illustrated in FIG. 3, one of the body components could be formed having a circumferentially extending shoulder or lip or crimped portion that is engaged with a complementary circumferential groove on the second body component. Additional embodiments are contemplated wherein staking (FIG. 5) is used to secure the body components together, the deformations from the staking preferably being arranged radially about the body portions 16 and 14. In still other embodiments (also not shown), a lip, individual tabs, or some other structure on or proximate flange 21 of lower body component 16 is/are crimped inwardly to overlap a portion of upper body component 14.

Figure 4:
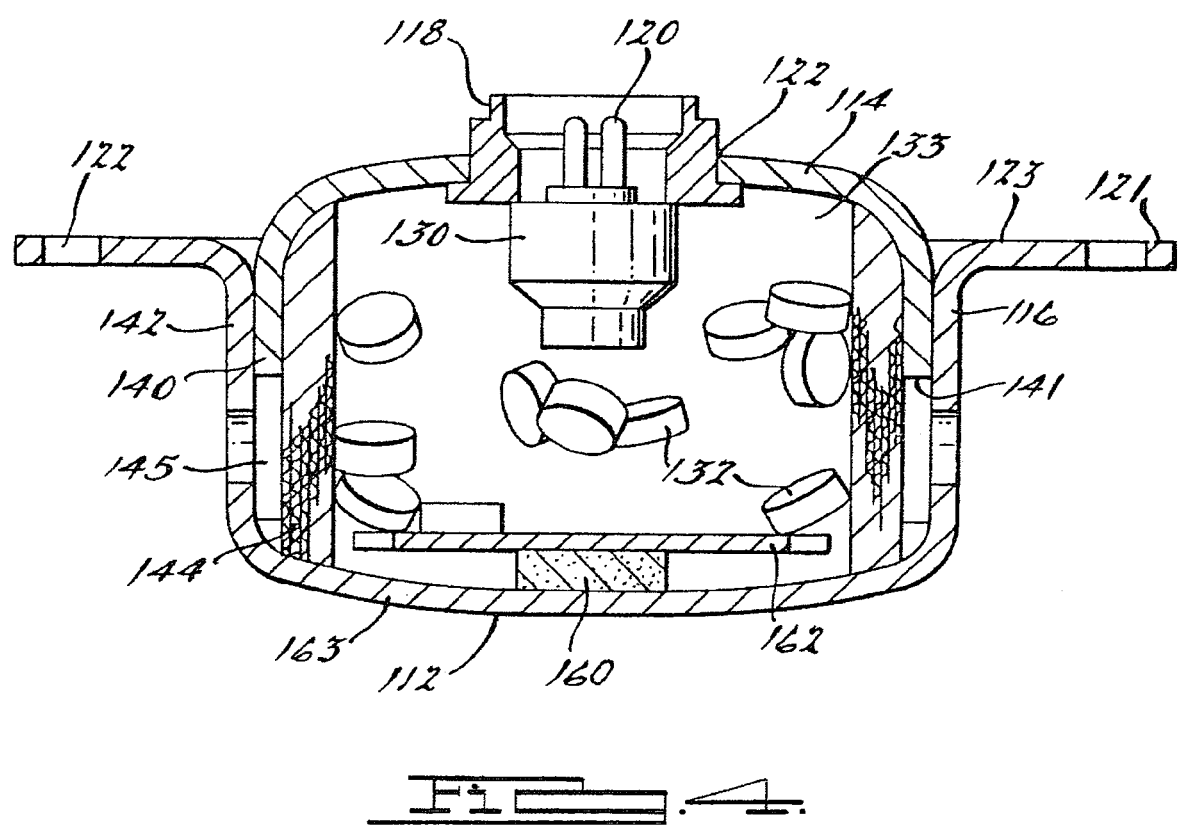
FIG. 4 is a sectioned side view of a second preferred embodiment of the present invention.

In the FIG. 2 embodiment, the overlapping interface of sidewalls 40 and 42 extends along sidewall 42, and a first set of radial apertures 46 in sidewall 42 are aligned with a second set of apertures 48 in sidewall 40. During assembly, upper body portion 16 is preferably pressed with lower body portion 14 until the respective sets of apertures are brought into alignment, fluidly connecting the exterior of inflator body 12 to interior 33. In other preferred embodiments, such as that shown in FIG. 4, the overlapping interface of sidewalls 140 and 142 extends only part way along sidewall 142, leaving a vertical gap 145 that separates an edge 141 of downwardly projecting portion 140 from a floor or base 163 of lower piece 116. The FIG. 4 embodiment has a number of similarities with the FIG. 2 embodiment. The three digit reference numerals used in FIG. 4 correspond generally with the two digit reference numerals used in FIG. 2, and denote similar, if not identical, features. Except where otherwise indicated, descriptions herein of the FIG. 2 embodiment are also applicable to the FIG. 4 embodiment. In the FIG. 4 embodiment, a plurality of apertures (not shown) are preferably positioned radially around lower piece 116, and fluidly connect the exterior of inflator body 112 to interior 133 via gap 145. In all contemplated embodiments, a filter unit 144, for example, a substantially cylindrical metallic mesh filter unit well known in the art, is preferably positioned adjacent portion 140. A welded wire mesh filter may be provided by Wayne Wire, Inc. of Kalkaska, Mich., for example. Other types of filters, for instance, expanded metal or woven carbon yarn filters might be used.

Returning to FIG. 2, in all preferred embodiments, the respective inflator body portions 14 and 16 are press fit to a depth sufficient to secure filter 44 therebetween. Filter unit 44 filters slag from the combustion of pyrotechnic materials, and serves as a heat sink for hot combustion gases produced during inflator activation in a known manner. In addition, various foils, burst shims, etc. (not shown), may be positioned in inflator 10, substantially blocking gas exchange through the apertures when the inflator is deactivated. This feature protects the gas generant from moisture degradation and enhances the combustion characteristics of the gas generant upon ignition, in a manner well known in the art.

As described, igniter 30 is preferably affixed to an igniter mount 18, and extends into the interior 33 of inflator body 12. Igniter 30 is thus preferably suspended in interior 33, and supported only by its attachment to igniter mount 18. A booster tube or other structural support is unnecessary for the portion of igniter 18 extending into interior 33. In a preferred embodiment, igniter mount 18 is press-fit into central bore 22 such that a shoulder 23 abuts an inner side of upper body piece 14. The adhesive that preferably assists in holding igniter mount 18 to upper body piece 14 may be disposed between shoulder 23 and upper body piece 14, as well as around the circumference of central bore 22 itself.

In the foregoing fashion, the entire inflator 10 may be assembled without welding the components. This represents a significant improvement over many earlier designs in which relatively costly, time-intensive welding was required. Moreover, by obviating the use of a welding step in manufacturing inflator 10, the danger of inadvertently igniting the gas generant is minimized. Furthermore, the domed shape of the inflator body increases its structural strength without the need for excessive thickening of the walls or the use of internal structural support components, minimizing the inflator's weight. Finally, the above-described design allows lowering of the excess volume of the inflator because it is unnecessary to use a booster tube or other internal supporting structure, further minimizing weight while maximizing available inflator volume for propellant. Such a design allows a lower overall internal volume for a given propellant load.

In a related aspect, the present invention contemplates a method of manufacturing inflator 10. A typical sequence of manufacturing steps begins by securing igniter mount 18 to upper body piece 14 by applying adhesive to the surfaces to be mated, then press fitting igniter mount 18 into bore 22. In related embodiments, the initiator assembly might be attached after the main body components (14 and 16), however, the preferred sequence requires attachment of the igniter mount 18 first. Prior to securing body portions 14 and 16, lower portion 16 is preferably loaded with the various internal components, including the autoignition material, filter, gas generant tablets, etc. Following loading of body portion 16 and attachment of igniter mount 18 to upper portion 14, lower portion 16 and upper portion 14 are positioned in substantially axial alignment. Stated another way, the respective cylinders defined by sidewalls 40 and 42 are positioned concentrically. Upper portion 14 and lower portion 16 are then press fit together. Either or both of the respective body portions may be pressed into engagement with the other body portion. Thus, one of the body portions may be held steady while the other body portion is pressed or, alternatively, both portions may be simultaneously pressed together. Whatever method is chosen, the respective body portions 14 and 16 are pressed relative to one another until second sidewall 40 extends the desired distance into first sidewall 42, preferably at least about one third of the cylindrical height of sidewall 42, approximately as shown in FIG. 2. Preferably prior to pressing the body components 14 and 16, one or more (preferably both) of the body components are crimped, for example forming the circumferential crimps illustrated in FIG. 3. Upon pressing the body portions together, the crimps fit into overlapping engagement, as shown in FIG. 3. As described herein, various alternative crimping strategies may be employed.

In a preferred embodiment, the present inflator is incorporated into a vehicle safety system having a crash sensor, for example, an accelerometer, capable of sending an electrical signal to igniter 30, thereby activating it. Upon receipt of the signal at contacts 20, igniter 30 ignites the booster propellant stored therein, which in turn ignites the main gas generant charge 32. Ignition of charge 32 results in a very rapid increase in internal gas pressure in inflator body 12. The generated gas passes through filter 44, removing slag and cooling, and then ejects through the inflation apertures 48 and 46, and into an airbag. The inflated airbag is deployed in a conventional manner to cushion a vehicle occupant against impact with portions of the vehicle interior.

The present description is for illustrative purposes only, and should not be construed to limit the breadth of the present invention in any way. Those skilled in the art will appreciate that various modifications could be made to the presently disclosed embodiments without departing from the spirit and scope of the present invention. Other aspects, features and advantages will be apparent upon an examination of the attached drawing Figures and appended claims.

What is claimed is:

1. An inflator for an inflatable restraint system in a vehicle comprising:
   a first body cup comprising a first set of radial apertures and having a base and a substantially cylindrical first crimped sidewall extending from said base; and
   a second body cup comprising a second set of radial apertures and having a domed base, and a substantially cylindrical second crimped sidewall extending from said domed base and substantially concentric with said first crimped sidewall;
   wherein said first and second crimped sidewalls are substantially linear, an inner surface of said first sidewall being substantially flush with an outer surface of said second sidewall around a circumference of said inflator, said first and second body cups are press fit together, thereby aligning the first and second crimped sidewalls and securing said first and said second body cups without welding, and, thereby substantially aligning said first and second radial apertures.

2. The inflator of claim 1 further comprising an initiator assembly positioned in a bore in said domed base, and secured therein with a press-fit and an adhesive.

3. The inflator of claim 1 further comprising an adhesive composition disposed at least partially along an interface of said first and second sidewalls.

4. The inflator of claim 1 wherein said first and said second body portions each comprise circumferentially crimped portions in substantially overlapping engagement.

5. The inflator of claim 1 wherein said first and said second body portions are staked.

6. A weld-less gas generator for a driver side inflatable restraint system in a vehicle comprising:
   an upper body piece having a domed region and a first cylindrical linear sidewall;
   a lower body piece having a base and a second cylindrical linear sidewall;
   an initiator assembly press fit with said upper body piece,
   wherein said upper and lower body pieces are positioned substantially coaxial and press fit such that the sidewalls at least partially overlap, an adhesive being disposed therebetween; and
   wherein at least one of said upper and lower body pieces is crimped to assist in securing the upper and lower body pieces upon press fitting.

7. The gas generator of claim 6 wherein said initiator assembly comprises:

an igniter mount press fit in a bore in said upper body piece;

an adhesive disposed between said upper body piece and said igniter mount; and an igniter having a first end attached to said igniter mount, and a second end suspended in the interior of said gas generator.

8. The gas generator of claim 6 wherein said lower body piece has a diameter greater than a diameter of said upper body piece.

9. The gas generator of claim 6 wherein said lower body piece has a diameter less then a diameter of said upper body piece.

10. A method of manufacturing a gas generator for an inflatable restraint system comprising the steps of:

placing a propellant charge in a first body cup having a base and a substantially cylindrical first sidewall extending from the base;

press fitting an initiator assembly into a bore in a second body cup having a domed base and a substantially cylindrical second sidewall;

positioning said first and second body cups in substantially coaxial alignment;

crimping the first and second body cups;

press-fitting the second body cup and the first body cup, the first side wall overlapping at least a portion of the second side wall and flush therewith; and applying adhesive to portions of the first and second body cups prior to the step of press fitting the first and second body cups, whereupon curing the adhesive assists in securing the first and second sidewalls, respectively, whereby a crimped portion of the first body cup and a crimped portion of the second body cup are positioned in a substantially overlapping fashion.

11. The method of claim 10 wherein the step of press fitting the first body cup with the second body cup comprises press fitting the cups such that a distance from a lateral region of the domed base to a lateral region of the first body cup base is substantially equal to a height of a cylindrical filter assembly positioned in the inflator.

12. The method of claim 10 wherein the step of crimping the first and second body cups comprises forming circumferential crimps about the first and second sidewalls, respectively.

* * * * *